Patented June 17, 1952

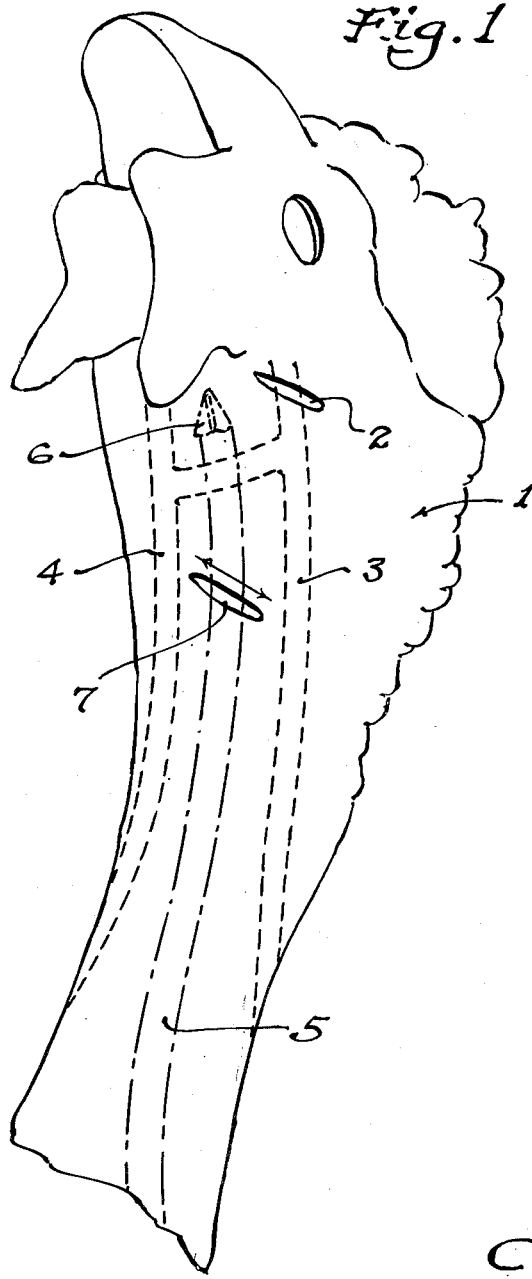
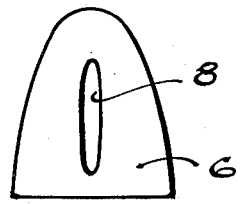

2,600,781

UNITED STATES PATENT OFFICE 2,600,781

POULTRY DRESSING METHOD

Carl H. Koonz, Chicago, Ill., assignor to Swift & Company, Chicago, Ill., a corporation of Illinois Application October 2, 1950, Serial No. 188,039

5 Claims. (Cl. 17—45)

The present invention relates to a method of preventing the intake of water or other liquid in lungs and air sacs of poultry during the dressing thereof, and represents an improvement over the method disclosed in my earlier patent, No. 2,502,794.

As discussed in the aforementioned patent, the problem of contamination of poultry by reason of the intake of bath water into the lungs and air sacs thereof during scalding operations is somewhat undesirable in the poultry industry.

The birds are generally immersed in water at approximately 129° F. within 30 to 60 seconds after severance of the jugular vein or veins. Although the birds are insensible at this time, they often have the capacity to draw water into the lungs. The scald water is contaminated with micro-organisms which, if drawn into the lungs of the bird, decreases the salable life of such birds.

It has further been found that New York dressed birds will take up some of the water used in ice chilling. This water comes in through the trachea and gains entrance to the lungs and air sacs directly connected with the lungs. It appears that in certain instances the water will break through the lung tissues and accumulate in the body cavity in the vicinity of the lungs.

The addition of lamp black or the water-soluble dye nigrosine to the scald or ice water has been used to determine the frequency and extent of the contamination of poultry through this drawing of contaminated water into the respiratory apparatus, and it has been found that some birds, when killed in the conventional manner, i. e., by severing the jugular veins as well as piercing the brain, draw water into the lungs.

In my prior patent, No. 2,502,794, the use of a clamp applied externally of the neck of the poultry and in such a manner as to pinch or restrict the trachea while the bird was undergoing scalding, was disclosed as a solution to this problem.

The present invention is directed to still another method of meeting the problem, and has the further advantage that no clamps or the like are required.

It is an object of the present invention to so treat the trachea or windpipe of poultry at the time the bird is killed or at any time thereafter prior to the time the bird is subjected to a liquid bath, that the liquid is prevented from passing therethrough and entering the lungs of the bird.

It is more specifically an object of this invention to provide a method of dressing poultry to overcome the disadvantages of water entering the respiratory systems of the poultry during scalding or chilling wherein the trachea or windpipe of the poultry is severed at a particular point.

Additional objects if not specifically set forth herein will be readily apparent to one skilled in the art from the following detailed description of the invention.

In the drawings:

Fig. 1 shows a representation of the head and neck of a chicken with the trachea, jugular veins and the like indicated thereon; and Fig. 2 is an enlarged illustration of the larynx of the chicken shown in Fig. 1.

Referring now to Fig. 1, the reference character 1 represents generally the head and neck of a chicken, which is one type of poultry to which the method of the present invention is applicable. The location of a correct cut for severance of the jugular veins, which represents the modern commercial method of killing, is indicated at 2. Shown in dotted lines are the jugular veins 3 and 4 on either side of the neck.

The trachea or windpipe, which is cylindrical and consists of from 90 to 120 cartilaginous rings, is located in the front of the bird's neck and is indicated by the dot-dash lines at 5 in Fig. 1. At the upper end of the trachea, in the region of the head of the chicken is the larynx, indicated generally by reference numeral 6. The upper surface of the larynx is roughly triangular in shape with the apex directed toward the opening of the mouth. An enlarged view of the larynx is shown in Fig. 2 of the drawings. Referring to Fig. 2, it will be seen that in the center of the larynx 6 is a slit-like opening 8 called the glottis. It is through the glottis that water from the scald tank or from the ice chill vats or other liquid treatment means finds its way into the trachea and eventually into the lungs and other tissues.

It has been found that water entering the glottis may be prevented from reaching the lungs of the bird by severing the trachea at a point posterior of the larynx. By so severing the trachea as indicated in Fig. 1 at 7, the cut end of the trachea detached from the larynx will withdraw for a distance beneath the skin of the neck. With the trachea so withdrawn, there is a sufficient interruption in the natural passage of water down through the glottis and into the trachea so that water can no longer gain entry to the trachea in sufficient amounts to subsequently find its way into the lungs. This holds true for birds during the time that they are immersed in water in a scald vat and during the time that they are left in ice-chill vats. Obviously any other type of liquid treatment of poultry wherein the poultry is immersed in a liquid bath would be within the scope of this invention.

In testing the effectiveness of the method of the present invention, a representative group of eight birds, four killed in accordance with the present invention by cutting the jugular veins at 7, and four birds killed in the conventional manner by cutting the jugular veins at 2 in Fig. 1, was immersed in scald water containing the dye nigrosine at a temperature of 128° F. for a period of one minute. Upon removal from the scald water, none of the four birds treated in accordance with this invention showed any trace of the entrance of scald water into the lungs. The remaining four untreated birds showed varying amounts of the black dye nigrosine in the lungs indicating that some of the contaminated scald water had entered the lungs of the birds.

A similar test was run using ice water at a temperature of 33° F. The birds treated in accordance with the present invention showed no trace of dye in their lungs after a chilling period of one hour's immersion in the dye-containing bath. The untreated birds again showed varying degrees of contamination of the body cavity-contained organs due to entrance of the dye-containing ice water.

It should be noted that it is extremely important that the trachea be severed posterior of the larynx. Unless severed at the correct place, the trachea will not withdraw and thus prevent the intake of water. For example, if the tracheal connection with the larynx is severed so as to include a part of the posterior portion of the larynx, the trachea will not withdraw sufficiently far to prevent intake of water.

The cut 7 to sever the trachea should be made in general as shown in Fig. 1. This incision may be made in the same manner as the cut for severance of the jugular veins, and may be made at the time of killing or at any time thereafter prior to exposure of the bird to a water treatment.

In the preferred form of the present invention, the operator holds the head of the bird firm by grasping the skin approximately at the point where the head and neck join. A knife with a long, narrow blade is inserted into the neck at a point below the larynx of the bird (see Fig. 1 at 7), in such a manner that the initial slit in the bird's neck is parallel to the long axis of the neck. After completely piercing the skin the knife is given a one-quarter turn so that the sharp edge of the blade is facing the deep part of the neck and the flat surface of the blade is at right angles to the long axis of the neck. A cut is then made in the direction of the arrow on Fig. 1 at 7 so that the trachea is severed just posterior to the larynx and also the veins are severed to permit proper and complete bleeding. When cut in this manner, the trachea will withdraw approximately one to two inches under the neck skin and thus permit immersion in scald or ice water without the possibility of water passing through the trachea to contaminate the lungs of the bird.

The invention is equally applicable in dressing poultry where other methods of killing the bird are employed. For example, (a) the chicken neck may be wrung, or (b) the head may be severed by a sharp instrument, or (c) the chicken may be killed by dislocation of the neck wherein the neck is dislocated and the jugular veins broken without breaking the skin, or (d) the brain and jugular veins pierced by means of a knife inserted in the mouth of the bird.

Obviously many modifications and variations of the invention, as hereinbefore set forth, may be made without departing from the spirit and scope thereof, and therefore only such limitations should be imposed as are indicated in the appended claims.

I claim:

1. In the method of dressing poultry wherein the poultry carcass is to be subjected to a liquid bath treatment, the steps of severing the trachea of the poultry at a point posterior to the larynx thereof, and thereafter subjecting said poultry to a liquid bath treatment.

2. The method of dressing poultry, which comprises rendering each bird insensible, severing the trachea of each bird at a point posterior to the larynx thereof and thereafter subjecting each bird to a liquid bath treatment.

3. The method of dressing poultry, which comprises the steps of killing each bird, cutting the trachea of each bird at a point posterior to the larynx thereof, and thereafter passing each bird through a scalding bath.

4. In the method of dressing poultry wherein the poultry carcass is to be subjected to an ice-chill bath, the steps of severing the trachea of the poultry at a point posterior to the larynx thereof after the poultry is killed and thereafter subjecting said poultry to an ice-chilled bath.

5. The method of dressing poultry, which comprises the steps of killing the poultry, severing the trachea thereof at such a point that the severed anterior portion of said trachea will withdraw from the severed posterior portion of said trachea, and thereafter subjecting the poultry to a liquid bath treatment.

CARL H. KOONZ.

No references cited.